US005946180A

United States Patent [19]

Simpson

[11] Patent Number: 5,946,180

[45] Date of Patent: Aug. 31, 1999

[54] ELECTRICAL CONNECTION SAFETY APPARATUS AND METHOD

[75] Inventor: Richard O. Simpson, Placerville, Calif.

[73] Assignee: OFI Inc., Placerville, Calif.

[21] Appl. No.: 09/140,484

[22] Filed: Aug. 26, 1998

[51] Int. Cl.[6] .......... H02H 3/00

[52] U.S. Cl. .......... 361/93; 361/1; 307/126; 439/488

[58] Field of Search .......... 361/1, 93; 307/147, 307/149; 439/488, 126

[56] References Cited

U.S. PATENT DOCUMENTS

| | | |
|---|---|---|
| 3,185,949 | 5/1965 | Jordan . |
| 3,769,549 | 10/1973 | Bangert, Jr. . |
| 4,386,333 | 5/1983 | Dillan . |
| 4,649,454 | 3/1987 | Winterton . |
| 4,915,639 | 4/1990 | Cohn et al. . |
| 5,369,352 | 11/1994 | Toepfer et al. . |
| 5,474,464 | 12/1995 | Drewnicki . |
| 5,577,923 | 11/1996 | Lee . |
| 5,642,248 | 6/1997 | Campolo et al. . |
| 5,660,554 | 8/1997 | Mead . |

*Primary Examiner*—Jeffrey Gaffin
*Assistant Examiner*—Ed Garlepp
*Attorney, Agent, or Firm*—Hall and Kerr

[57] ABSTRACT

An electrical connection safety apparatus which eliminates the risk of fire or electric shock associated with current overload faults in electrical systems. The apparatus senses or detects the electrical current rating of electrical cords or connectors which are plugged into electrical outlets and disconnects power to the outlet and connector whenever the cord current rating is exceeded. Connector current rating is indicated by the length of connector prongs and the connector current rating is detected by a movable member within an electrical receptacle when the connector prongs are plugged into the receptacle. Circuitry monitors the load current delivered to the receptacle and connector and compares the load current to detected current rating. When a current overload occurs, power to the receptacle and connector is disconnected. The receptacle resets itself when the connector is unplugged. The electrical connection safety apparatus can be used in the form of adaptors which couple to conventional electrical connectors and electrical outlets.

35 Claims, 5 Drawing Sheets

ELECTRICAL CONNECTION SAFETY APPARATUS AND METHOD

BACKGROUND OF THE INVENTION

1. Field of the Invention

This invention pertains generally to electrical sockets, receptacles, plugs and extension cords, and more particularly to an electrical connection safety apparatus which prevents fires and electrical shocks due to overload faults caused by defects associated with AC electrical appliances, outlets and cords and by improper use of electrical extension cords. The electrical connection safety apparatus of the invention senses the current rating of electrical cords when the cords are plugged into an electrical socket, and disconnects the power to the socket and cord when the load current through the socket and cord exceeds the cord current rating. The electrical connection safety apparatus may be used with conventional electrical cords and sockets, and will reset itself whenever a cord is unplugged or removed from a socket.

2. Description of the Background Art

The use of electrical "extension" cords is well known and is widely practiced in residential settings to allow power to reach electrical appliances which are remote from wall-mounted AC electrical outlets, sockets or receptacles. Electrical extension cords for use at relatively low current ratings are widely available, and a variety of power strips and multiple receptacle devices are often used in conjunction with extension cords to allow multiple appliances to draw power from a single extension cord. Because of the ease and convenience provided, extension cords have been and likely will continue to be overused as semi-permanent extensions of household electrical systems.

While the advantages provided by extension cords are well known, there are also important disadvantages associated with extension cord use. Particularly, a large percentage of residential and commercial fires are due to electrical causes involving extension cords. Persons using extension cords often lack sophistication with regard to electrical properties of the appliances, extension cords and receptacle devices. Thus, users of extension cords often select and purchase cords having the smallest physical size and position the cords under carpets or behind drapes in order to minimize visibility of the cords. In situations where the current flowing through an extension cord exceeds the cord's current rating, overheating of the internal conductors occurs which can result in the burning of cord insulation and materials adjacent to the cords, resulting in fires.

The fire risk associated with extension cord use has not been abated even though electrical safety is widely regulated by state, local and national government codes and regulations. For example, in the United States, the National Electric Code or NEC provides building safety codes which regulate the various parts of building electrical systems, including switches, lighting fixtures, wiring, outlets, circuit breakers, fuses and the like. However, NEC regulations essentially stop at the electrical outlet, and electrical appliances and extension cords are not regulated by building electrical codes. Local government ordinances generally require that all electrical appliances, extension cords and like items be approved by Underwriter's Laboratories or "UL." However, while building electrical systems and the appliances and cords used therewith are separately regulated to ensure safety, there are generally no regulations, ordinances or guidelines in place to provide for safety of the overall electrical system together with connected cords and appliances. Thus, a user of an electrical system can assemble one or more extension cords and appliances with a building electrical system, each of which complies with government codes, to achieve an arrangement which is unsafe and presents a risk of fire and electric shock.

The above problem is illustrated by the following scenario. In the United States, a typical wall-mounted AC electrical outlet or receptacle for residential use is rated to handle fifteen amperes of current. Electrical protective devices such as circuit breakers and/or fuses are generally associated with the electrical outlet and will "trip" or disconnect the outlet in the event that a current overload through the outlet occurs. A user connects a standard electrical extension cord rated for ten amperes of current to the outlet, and then connects a multiple receptacle power strip to the extension cord. The user then connects three electrical appliances to the power strip, with each appliance operating normally with a five ampere current load. In the event that all three appliances are activated or turned on simultaneously, each appliance will simultaneously draw a five ampere current load, resulting in fifteen amperes of current flowing through the ten ampere extension cord. Since the current rating of the cord is exceeded, the cord conductors can overheat and burn the cord insulation and adjacent materials, and thus cause a house fire. The circuit breaker or other safety device which protects the outlet will not trip or otherwise interrupt the current flow because the current through the outlet has not exceeded the outlets fifteen ampere threshold. Thus, even though the building electrical system, extension cord and appliances each comply with safety codes, a fire can result from their use, and the fire is not avoided by the current overload protection provided by the circuit breaker.

Other current overload faults can develop in residential situations wherein the conventional overload protection provided by circuit breakers will also fail to prevent a fire. Electrical appliances such as televisions, refrigerators, toasters, computers and the like can, and often due, develop internal faults that cause a "hot spot" within the appliance. For example, in appliances wherein an electric motor drives rotating or moving parts, such as in refrigerators, the bearings or bushings wear and lose lubrication, and the electric current needed to operate the motor increases in order to overcome the friction. When such an appliance failure occurs, the current load drawn by the appliance will include the normal operating current together with fault-induced current. This total current can exceed the current rating of the electrical cord of the appliance but still be insufficient to trip the protective circuit breaker, and thus result in a fire as the cord overheats. Additionally, many appliances include internal combustible materials which can ignite as a result of current overload.

Still another situation in which an overload fault can result in a fire involves electrical outlets themselves and the circuit breakers or fuses installed to protect them from overload situations. As noted above, in the United States, residential electrical outlets are typically rated for fifteen amperes of current. For various reasons, circuit breakers or fuses are often inadvertently installed which have higher current trip levels, such as twenty amperes, than the electrical outlet current rating. In such situations the electrical outlets themselves can overheat and cause a fire.

Various devices are known for protection against ground faults associated with appliances and cords, such as ground fault circuit interrupters and ground fault shields. However, these devices offer no protection in current overload fault situations. Presently, there are no available devices or systems which can remedy the aforementioned problems associated with current overload faults in electrical appliances, extension cords or outlets.

Accordingly, there is a need for an electrical connection safety apparatus which provides protection against overload faults in electrical systems which could otherwise result in a fire. The present invention satisfies this need, as well as others, and generally overcomes the deficiencies found in the background art.

SUMMARY OF THE INVENTION

The present invention is an electrical connection safety apparatus and method which eliminates the risk of fire or electric shock associated with current overload faults in electrical systems. The apparatus senses or detects the electrical current rating of electrical cords which are plugged into electrical outlets and disconnects power to the outlets and cords whenever the cord current rating is exceeded. The invention can be used with conventional electrical cords and electrical outlets which are presently in use.

In general terms, the invention comprises means for sensing or detecting the current rating of an electrical cord, means for sensing or detecting the load current delivered through the electrical cord, and means for disconnecting power to the electrical cord when the load current exceeds the cord's detected current rating. The invention also preferably comprises means for indicating the current rating of electrical cords, means for resetting the power disconnecting means, means for preventing power disconnection due to "false" overload detection, and means for indicating the location of a current overload fault.

By way of example, and not of limitation, the cord current rating indicating means preferably comprises a detectable mechanical feature associated with prongs or connectors which terminate an electrical cord. Preferably, prongs of different length are used to indicate different cord current ratings, with longer prongs generally corresponding to higher cord current ratings. The thickness, shape or other physical feature of the prongs may alternatively be used to indicate different cord current ratings. The detectable mechanical feature may be an integral part of the electrical cord connector, or may be in the form of an adapter which is coupled to the cord connector.

The means for detecting cord current rating preferably comprises means for mechanically detecting the length of electrical cord connector prongs and means for generating an electric signal output corresponding to the detected prong length. Preferably, the mechanical detection means comprises a movable member, associated with an electrical receptacle or socket, which is moved by the prongs of the electrical cord connector as the prongs are inserted into the receptacle. The distance moved by the movable member corresponds to the length of the cord connector prongs. The electric signal output generating means preferably comprises a variable resistor, associated with the movable member, which generates a resistance output responsive to the degree of movement of the movable member. The movable member may be pivotally or slidably associated with the electrical receptacle, or otherwise movably mounted in a manner which allows the movable member to undergo a range of motion which corresponds to the length of the electric cord prongs. Preferably, a spring biases the movable member towards a neutral or reset position such that, when the prongs of an electrical cord are withdrawn from the receptacle, the movable member moves back to the reset position. The electric signal output generating means may alternatively be based on capacitance, inductance or other electrical effect.

The means for sensing or detecting the load current to the electrical cord preferably comprises a transformer that generates a voltage signal which is proportional to the load current drawn through the electric cord. The transformer preferably comprises a simple one turn primary wherein a voltage output is generated in a secondary winding. The load current sensing means may alternatively comprise other standard means for generating an electronic signal which is responsive to load current.

The means for disconnecting power to the electrical cord when the load current exceeds the cord's detected current rating preferably comprises electronic means for monitoring the load current, means for comparing the load current to the cord current rating, and means for activating a power disconnect relay when the load current exceeds the cord current rating. The aforementioned means are preferably embodied in electronic circuitry or hardware which carries out the operations of periodically monitoring sensed load current, periodically comparing the sensed load current to the detected cord current rating, and activating the power disconnect relay when the load current exceeds the cord current rating. The means for carrying out these operations may alternatively be embodied in software which runs on a conventional microprocessor.

The means for resetting the power disconnecting means preferably comprises reset contacts associated with the movable member, and circuitry or software means for reconnecting or re-activating power when the movable member moves to a reset position. The means for preventing power disconnection due to "false" overload detection preferably comprises circuitry or software which prevents activation of the power disconnect relay unless the load current has exceeded the cord current rating for a predetermined amount or length of time. The means for indicating the location of a current overload fault preferably comprises indicator lights associated with a dual receptacle electrical outlet that indicate which receptacle has experienced an overload.

An object of the invention is to provide an electrical connection safety apparatus and method which prevents fires caused by the electrical overloading of extension cords.

Another object of the invention is to provide an electrical connection safety apparatus and method which prevents fires caused by current overload faults associated with electrical appliances.

Another object of the invention is to provide an electrical connection safety apparatus and method which prevents fires caused by overloading of electrical outlets.

Another object of the invention is to provide an electrical connection safety apparatus and method which senses or detects the current rating of an electrical cord or other connector as it is plugged into an electrical outlet and which disconnects power to the electrical cord and outlet when the load current through the cord exceeds the detected cord current rating.

Another object of the invention is to provide an electrical connection safety apparatus and method which automatically resets itself whenever the electrical cord is removed.

Another object of the invention is to provide an electrical connection safety apparatus and method which can be used with conventional electrical cords and electrical sockets.

Another object of the invention is to provide an electrical connection safety apparatus and method which is quick and easy to install and use.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 11:
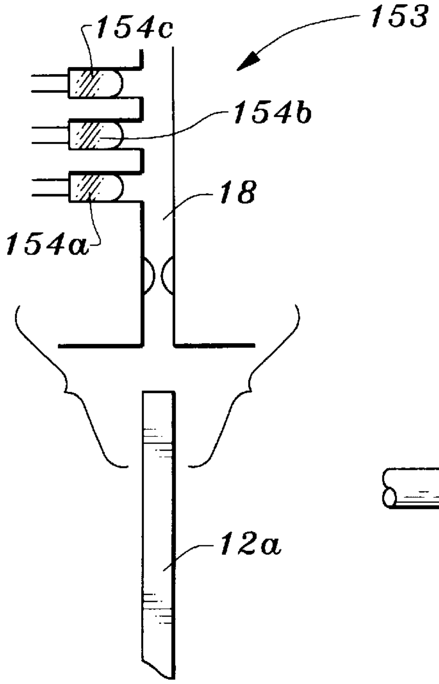
FIG. 11 is a functional diagram of an electrical receptacle optical detector system for the cord connector prongs of FIG. 1.
Figure 12:
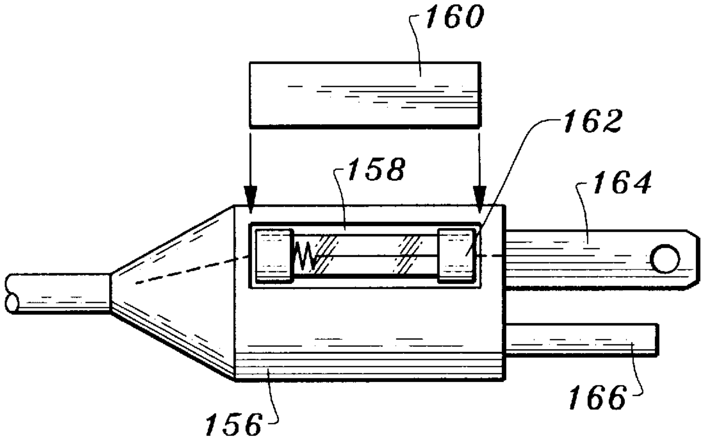
FIG. 12 is side elevation view in partial cross-section of an electrical cord connector with a replaceable fuse.
Figure 13:
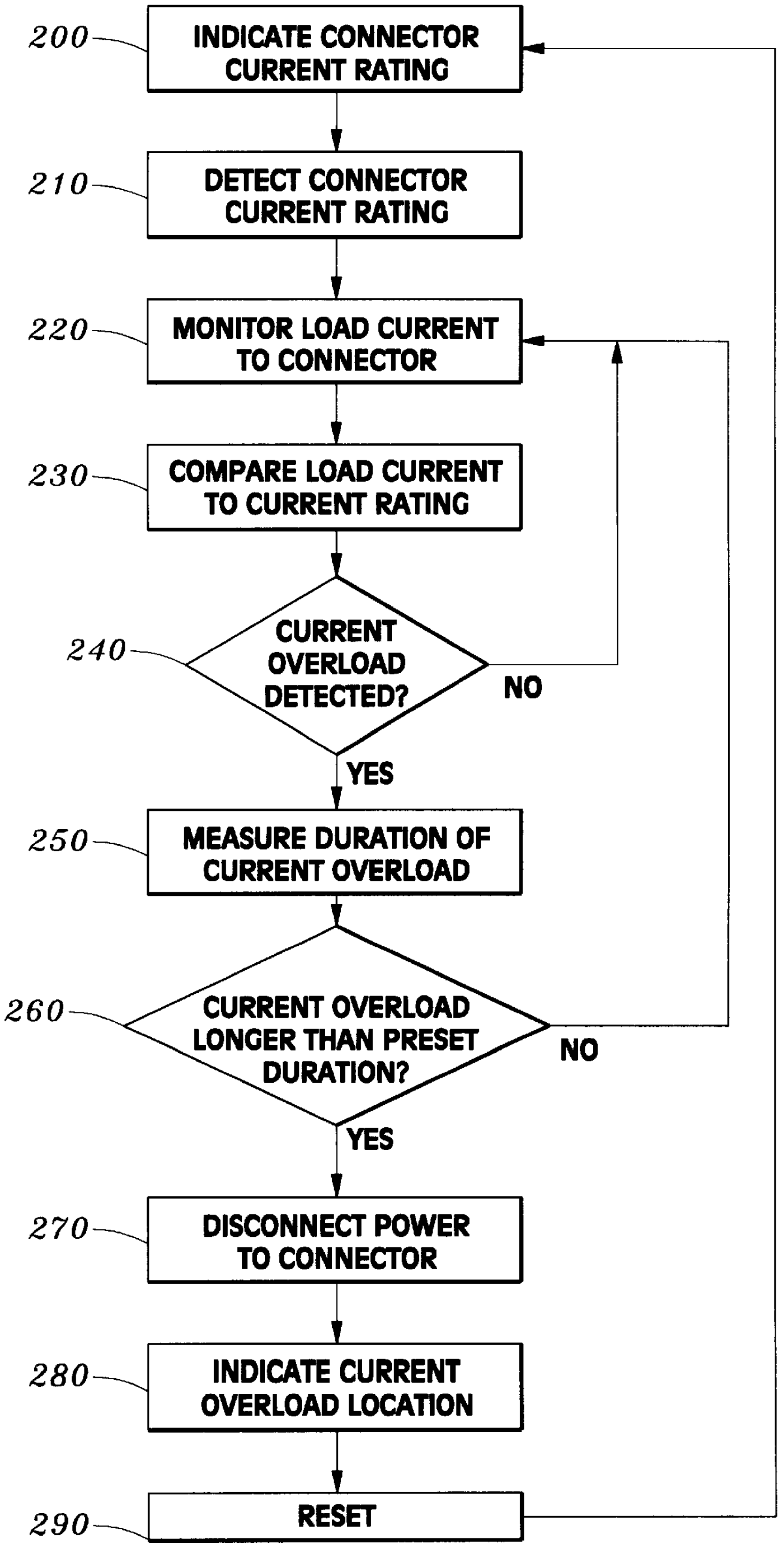
FIG. 13 is a flow chart illustrating the method of using the invention.

Referring more specifically to the drawings, for illustrative purposes the present invention is embodied in the apparatus shown generally in FIG. 1 through FIG. 12, and the method shown in FIG. 13. It will be appreciated that the apparatus may vary as to configuration and as to details of the parts, and that the method may vary as to details and the order of the steps, without departing from the basic concepts as disclosed herein. The term "connector" as used herein means electrical connector devices generally, including any associated electrical cord or conductors. Thus, "connector" means electrical cords, extension cords, appliance cords, plugs, adaptors or any other type of connector or electrical connection device having connector prongs which can engage or plug into an electrical socket or receptacle.

Figure 1:
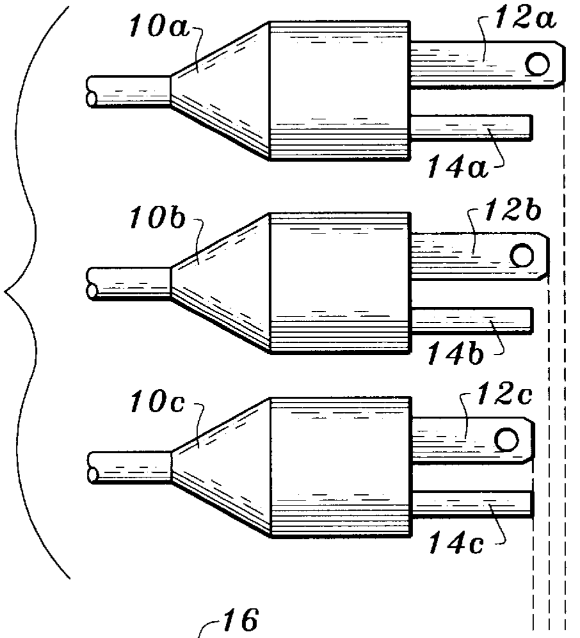
FIG. 1 is a side elevation view of electrical cord connectors in accordance with the present invention wherein the length of connector prongs are indicative of the electrical cord current rating.

Referring now to FIG. 1, the electrical connection safety apparatus of the invention comprises means for indicating the current rating of an electrical connector such as electrical cord connectors 10*a*, 10*b*, 10*c*. Connectors 10*a*, 10*b*, 10*c* are shown as typical electrical extension cord or appliance cord connectors of the type used in the United States. As noted above, extension cords, appliance cords and other connectors typically have maximum electrical current ratings which, when exceeded, create a risk of fire. The current rating indicating means of the invention preferably comprises a mechanically detectable feature associated with a connector 10*a*, 10*b*, 10*c*. Most preferably, the means for indicating the current rating of connectors 10*a*, 10*b*, 10*c* comprise connector prongs 12*a*, 12*b* 12*c* of varying length, with the longer prongs generally indicating higher current ratings. As shown, connector prong 12*a* is longer than connector prong 12*b*, which is longer than connector prong 12*c*. The longest connector prong 12*a*, for example, indicates a current rating for connector 10*a* of fifteen amps, while intermediate length connector prong 12*b* indicates a current rating of ten amps for connector 10*b*, and the shortest connector prong 12*c* indicates a current rating of five amps for connector 10*c*. Alternatively, shorter connector prongs could indicate higher current ratings.

Various other mechanical features associated with prongs 12*a*, 12*b*, 12*c* could be utilized to indicate current rating, such as prong thickness or shape, or the presence of grooves, serrations, tapers or other mechanically detectable indicia which could represent or encode the current rating of connectors 10*a*, 10*b*, 10*c*. Current rating may also be indicated by varying length or other mechanical feature associated with ground connector prongs 14*a*, 14*b*, 14*c* on connector 10*a*, 10*b*, 10*c*. Connectors 10*a*, 10*b*, 10*c* are shown in a typical configuration for use in the United States. Various other connector and prong arrangements, such as those used in Europe and elsewhere, may also be employed with the present invention. Optical means for indicating current rating may also be used with the invention, and are discussed further below.

Figure 2:
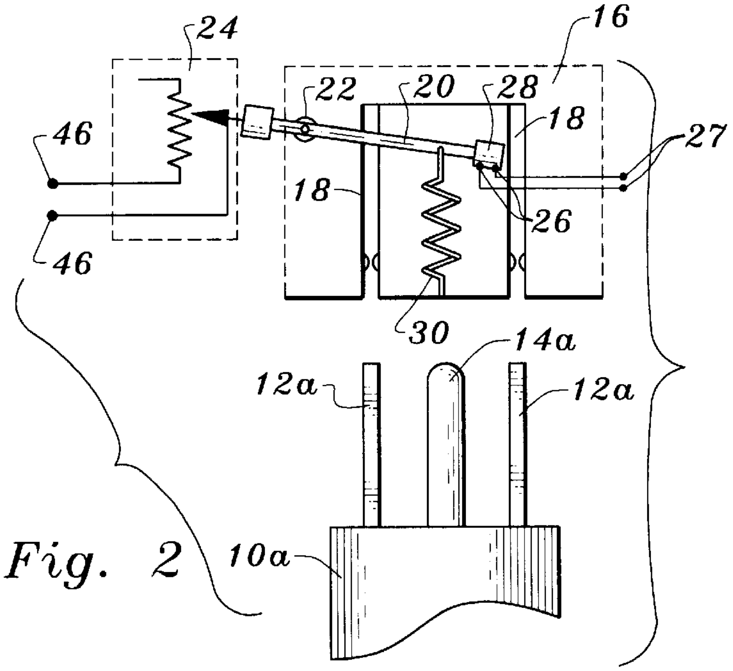
FIG. 2 is a functional diagram of an electrical receptacle in accordance with the present invention shown together with an electrical connector.

Referring now to FIG. 2, an electrical outlet, socket or receptacle 16 in accordance with the invention is generally shown, together with electrical connector 10*a*. Receptacle 16 includes a pair of generally parallel slots or openings 18 which are structured and configured to slidably receive prongs 12*a* of connector 10*a* in a conventional manner. Receptacle 16 additionally includes a slot or opening (not shown) which receives ground prong 14*a* of connector 10*a*. When prongs 12*a*, 14*a* of connector 10*a* are fully inserted into slots 18 of socket 16, prongs 12*a*, 14*a* will connect with or contact the line, neutral and ground conductors (not shown) of an electric power circuit in a standard manner.

Means for sensing or detecting the current rating of electrical connector 10*a* are associated with receptacle 16, preferably in the form of a movable member or pivot arm 20 which is pivotally mounted in receptacle 16 by hinge or pivot point 22. Movable arm 20 is positioned such that, when connector prongs 12*a* are inserted into slots 18 of receptacle 16, one of the prongs 12*a* will push on or otherwise interact with movable arm 20 so that movable arm 20 pivots about hinge 22. The amount of movement of arm 20 varies with the length of connector prong 12*a*, so that different length connector prongs will result in correspondingly different degrees of pivotal motion of movable arm 20. Movable arm 20 thus provides means for detecting the length of connector prong 12*a*. As shown, only one connector prong 12*a* interacts with movable arm 20. Receptacle 16 and movable arm 20, however, could be structured and configured to allow both prongs 12*a* to interact with movable arm 20. Various other means for detecting connector current rating and length of connector prongs may also be used with the invention, and are discussed further below.

Means for generating an electric signal or output responsive or corresponding to the length of connector prong 12*a* are also included with receptacle 16, and preferably comprise a variable resistor 24 associated with the end of movable arm 20. The setting or position of variable resistor 24, and the signal output from variable resistor 24, varies with the position of movable arm 20 and the length of connector prongs 12*a* inserted into slots 18. Thus, when connector prongs 12*a* are inserted into slots 18 of receptacle 16, variable resistor 24 will generate a signal output corresponding to the length of connector prongs 12*a* and the magnitude of displacement of movable arm 20 by prongs 12*a*. Various other electric signal generating means may be used with the invention, including variable capacitance and inductance devices, which can generate a variable output according to movement of a movable member 20 and the length of connector prong 12*a*. The signal generating means could alternatively be optical in nature, such as a photoemitter-photodetector device.

The invention includes means for resetting the power disconnecting means, which preferably comprises a pair of reset contacts 26, a conductor 28 on movable arm 20, and a spring 30 which biases movable arm 20 towards a "reset" or neutral position. When connector prongs 12*a* are inserted into slots 18 of receptacle 16, connector prongs 12*a* overcome the bias of spring 30 to push movable arm 20 and move variable resistor 24 according to the length of prongs 12*a*. When connector prongs 12*a* are withdrawn from slots 18 and receptacle 16 by "unplugging" connector 10*a*, spring 30 acts on movable arm 20 to draw or move arm 20 back towards the neutral or reset position wherein the conductor element 28 on the end of movable arm 20 touches or shorts reset contacts 26. While in the reset position, variable resistor 24 generates a signal output indicating that no connector is associated with receptacle 16. Movable arm 20 is shown in the neutral or reset position in FIG. 2, with conductor 28 engaging reset contacts 26. When in an "activated" position wherein prong 12*a* is pushing on movable arm 20, conductor element 28 is physically separated or disengaged from reset contacts 26.

Figure 3:
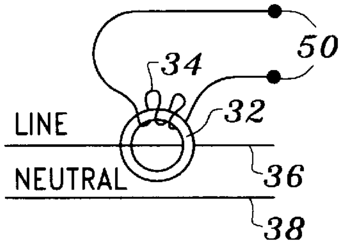
FIG. 3 is a ring transformer shown as used for detecting load current.

Referring to FIG. 3, as well as FIG. 2, means for detecting or sensing a load current delivered to an electrical connector are included with the invention, and preferably comprise a simple one turn primary transformer 32 with a secondary winding 34. Line or "hot" conductor 36 and neutral conductors 38 communicate with a power supply (not shown) and with contacts (not shown) associated with slots 18 of receptacle 16, with line conductor 36 passing through the ring of primary transformer 32. Prongs 12*a* of connector 10*a* engage the contacts associated with slots 18 so that the load current delivered through conductors 36, 38 is received by prongs 12*a* and connector 10*a* in a conventional manner to provide electrical power to cords and/or appliances associated with connector 10*a*. A voltage signal V(load) is generated in the secondary winding 34 of transformer 32 by the load current passing through conductor 36, with V(load) being proportional to the load current delivered through conductor 36 to connector 10*a*. The use of a transformer 32 to produce an electric signal proportional to load current is only one possible current detecting means. Load current through conductors 36, 38 could alternatively be sensed or detected by heat, magnetic field or other effect associated with the passage of current through a conductor, with corresponding responsive signal outputs generated.

Figure 4:
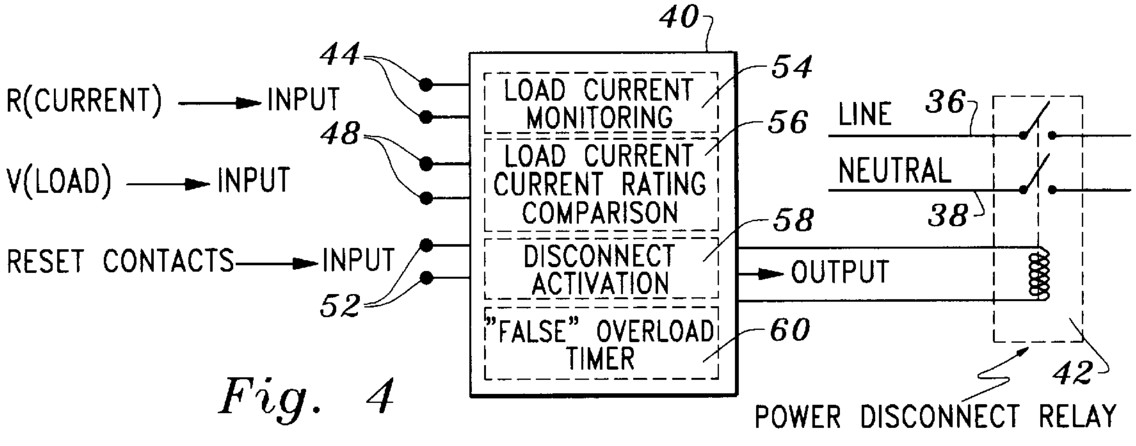
FIG. 4 is a functional block diagram of a power disconnect circuit in accordance with the present invention.

Referring now to FIG. 4, as well as FIG. 2 and FIG. 3, the invention includes means for disconnecting power to an electrical connector and receptacle when an overload fault occurs or when the load current exceeds the current rating of the electrical connector. The power disconnecting means preferably comprises a circuit board or like hardware device 40 together with a power disconnect relay 42. Circuit board 40 includes current rating input contacts 44 which are operatively coupled to output contacts 46 associated with variable resistor 24. Load current monitoring input contacts 48 are operatively coupled to output contacts 50 associated with winding 34 on primary transformer 32. Reset input contacts 52 are operatively coupled to reset output contacts 27, which communicate with the reset contacts 26 associated with movable arm 20. Power disconnect relay 42 interrupts or disconnects conductors 36, 38, and is positioned "upstream" from receptacle 16 so that disconnection of conductors 36, 38 will interrupt power to receptacle 16 and connector 10*a*. Ring transformer 32 and winding 34 may be located "upstream" or "downstream" from disconnect relay 42.

The power disconnecting means of the invention may alternatively comprise a TRIAC or other solid state electric disconnect switch which can interrupt power. The TRIAC or like solid state disconnect switch would operate with power disconnect activation circuitry in generally the same manner described above to interrupt power through lines 36, 38.

Circuit board 40 includes hardware or circuitry which provides means for monitoring the load current detecting means, shown generally as load current monitoring circuit 54. Load current monitoring circuit 54 carries out the operation of periodically monitoring, updating or verifying the voltage signal V(load) from transformer 32, to ascertain the load current which is being delivered to receptacle 16 and connector 10*a*.

Means for comparing detected or measured load current to the current rating of an electrical connector are also included in circuit board 40, and are shown generally as load current-current rating comparison circuit 56. Comparison circuit 56 carries out the operation of periodically comparing the load current detected by transformer 32 and secondary winding 34 to the current rating for connector 10*a* detected by movable arm 20 and variable resistor 24. Generally, the detected current rating of connector 10*a* is communicated to circuit board 40 via input contacts 44 as a resistance signal R(current) from variable resistor 24 which corresponds to the current rating of connector 10*a* according to the sensed length of connector prong 12*a*, as described above.

Disconnect activation circuitry 58 in circuit board 40 provide means for activating or opening power disconnect relay 42 to disconnect conductors 36, 38, and thus interrupt power to receptacle 16 and connector 10*a*, when the detected load current exceeds the current rating detected for connector 10*a*. The term "exceeds the current rating" means or refers to the occurrence of an overload fault generally, wherein measured load current exceeds a predetermined threshold which is equal to, proportional to, greater than or otherwise associated with the current rating detected for the connector 10*a* plugged into receptacle 16. Thus, the present invention can be utilized such that power disconnect relay 42 is tripped or disconnected upon detection of a load current less than (or greater than) the actual current rating. In the preferred embodiment, however, disconnect activation circuit 58 trips relay 42 generally at the point which the load current to connector 10*a* has measurably exceeded the current rating for connector 10*a*. Disconnect activation circuit 58 also carries out the operation of deactivating or reconnecting power circuit relay 42 when a reset signal is received from the power disconnect reset means via reset input contacts 52 due to conductor element 28 shorting reset contacts 26 when connector 10*a* is unplugged or disengaged from receptacle 16.

Preferably, circuit board 40 also includes means for avoiding or preventing power disconnection due to "false" current overloads. During standard operation of many appliances and electrical systems, there are often situations wherein a brief, temporary load current spike occurs, such as during a normal starting current surge situation for an electrical appliance. The temporary current spikes are not true current overloads which will result in a risk of fire, and thus it is desirable to avoid "nuisance" tripping or disconnecting of relay 42 when such false current overloads occur. Circuit board 40 includes a false overload timing circuit 60 as means for preventing disconnection due to false or temporary overloads. Timing circuit 60 includes an oscillating quartz crystal (not shown) or other conventional time keeping means, and timing circuit 60 carries out the operations of measuring the time or duration in which the load current exceeds the connector current rating and preventing disconnection of relay 42 if such duration is less than a predetermined amount. Typically, startup current spikes for appliances can last for up to two seconds, and timing circuit 60 thus, for example, avoids tripping of relay 42 unless the detected load current exceeds the connector current rating for a period of greater than two seconds.

The load current monitoring circuit 54, load current/current rating comparison circuit 56, disconnect activation circuit 58 and false overload timing circuit 60 on circuit board 40 as related above all carry out functions or operations using conventional circuitry and hardware configurations which are well known to those skilled in the art. The operations carried out by circuit board 40 can alternatively be embodied in software which runs on a conventional microprocessor. In that regard, circuit board 40 would be replaced by a microprocessor having software or programming which carries out the operations of monitoring the load current delivered to receptacle 16 and connector 10*a*, comparing the load current to the current rating detected for connector 10*a*, disconnecting or interrupting power to receptacle 16 and connector 10*a* in the event that the load current exceeded the current rating of connector 10*a*, and preventing power interruption in cases where temporary or false overloads are detected.

In operation, electrical receptacle 16 and circuit board 40 are preferably embodied in a single electrical outlet device such as an electrical wall outlet. A user of the invention inserts a connector 10*a* into receptacle 16 in a standard manner, so that connector prongs 12*a* engaged slots 18. Prong 12*a* pushes on and pivots movable arm 20 by an amount which is proportional to the length of prongs 12*a*. The length of prongs 12*a* indicate the current rating of connector 10*a*, as noted above. Movable arm 20 moves variable resistor 24 such that variable resistor 24 creates a resistance signal output R(current) responsive to the length of prong 12*a* and the current rating of connector 10*a*. The resistance signal from variable resistor 24 is communicated to circuit board 40. The load current passing through receptacle 16 and connector 10*a* is detected or sensed by primary transformer 32 and secondary winding 34, and a voltage signal V(load) is communicated therefrom to circuit board 40. Load current monitoring circuit 54 periodically monitors the voltage signals representing the sensed load current, and comparison circuit 56 periodically compares the load current voltage signals to the resistance signal representing the detected current rating of connector 10*a*. When comparison circuit 56 recognizes or notes that the load current indicated by the voltage signals exceeds the connector current rating indicated by the resistance signals, a current overload to connector 10*a* is recognized by comparison circuit 56. Timing circuit 60 then measures the duration of the current overload period in which the load current exceeds the connector current rating. If the duration of the current overload exceeds a certain threshold which indicates that the current overload is not a "false" overload such as temporary current spike, disconnect activation circuit 58 then activates power disconnect relay 42 to interrupt or disconnect power to receptacle 16 and connector 10*a*.

Following power disconnection, the user can then correct the cause of the overload fault, and disengage connector 10*a* from receptacle 16 to reset receptacle 16. When connector 10*a* is disengaged from receptacle 16, movable arm 20 moves back to the "reset" position shown in FIG. 2, wherein reset contacts 26 are shorted by conductor element 28, sending a reset signal from contacts 26 to circuit board 40 via input 52 indicating that no connector is engaged or plugged into receptacle. Disconnect activation circuit 58 then closes power disconnect relay 42 upon receiving the reset signal to apply power to receptacle 16 and connector 10*a* again. Additionally, while movable arm 20 is in the reset position, variable resistor 24 will provide a "reset" resistance signal output to circuit board to indicate a reset condition. When connector 10*a* or another connector is then inserted or plugged into receptacle 16, movable arm 20 will move according to the connector prong length as described above to again indicate a connector current rating, and aforementioned sequence of events is generally repeated.

Figure 6:
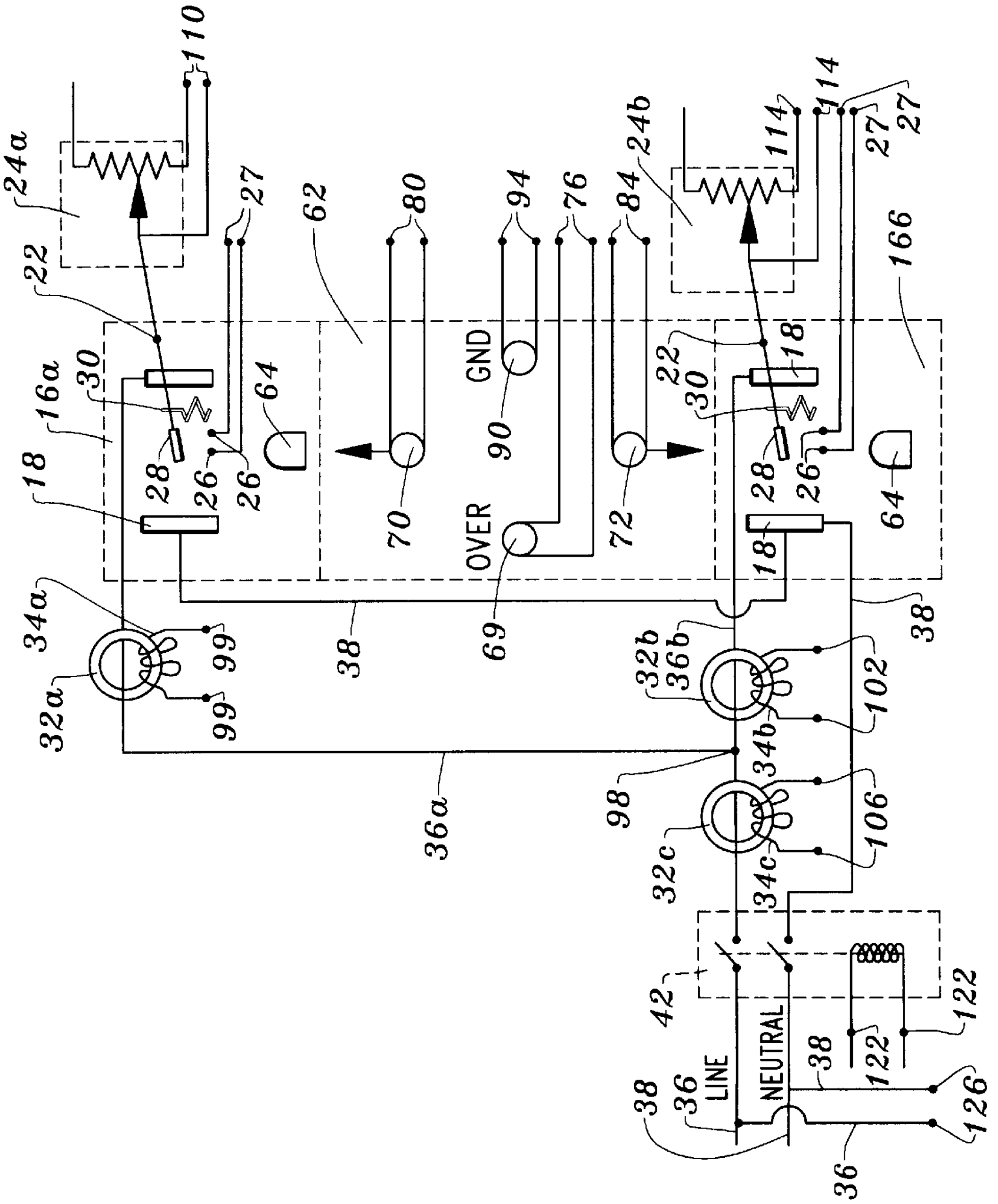
FIG. 6 is a functional diagram of the dual receptacle electrical outlet of FIG. 5.
Figure 5:
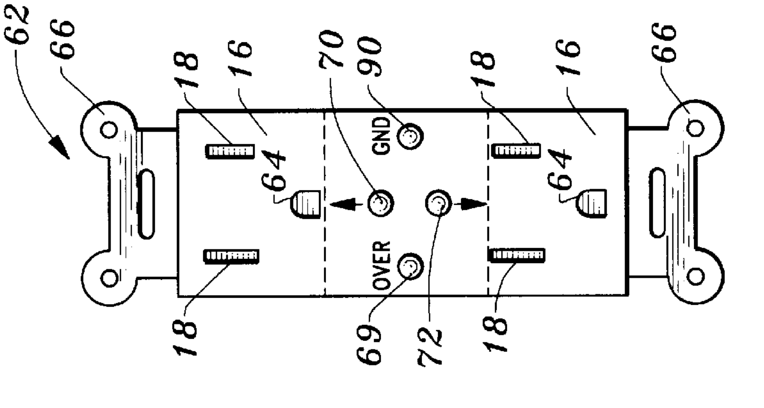
FIG. 5 is a front elevation view of a dual receptacle electrical outlet in accordance with the present invention shown with overload and ground fault indicator lights.
Figure 7:
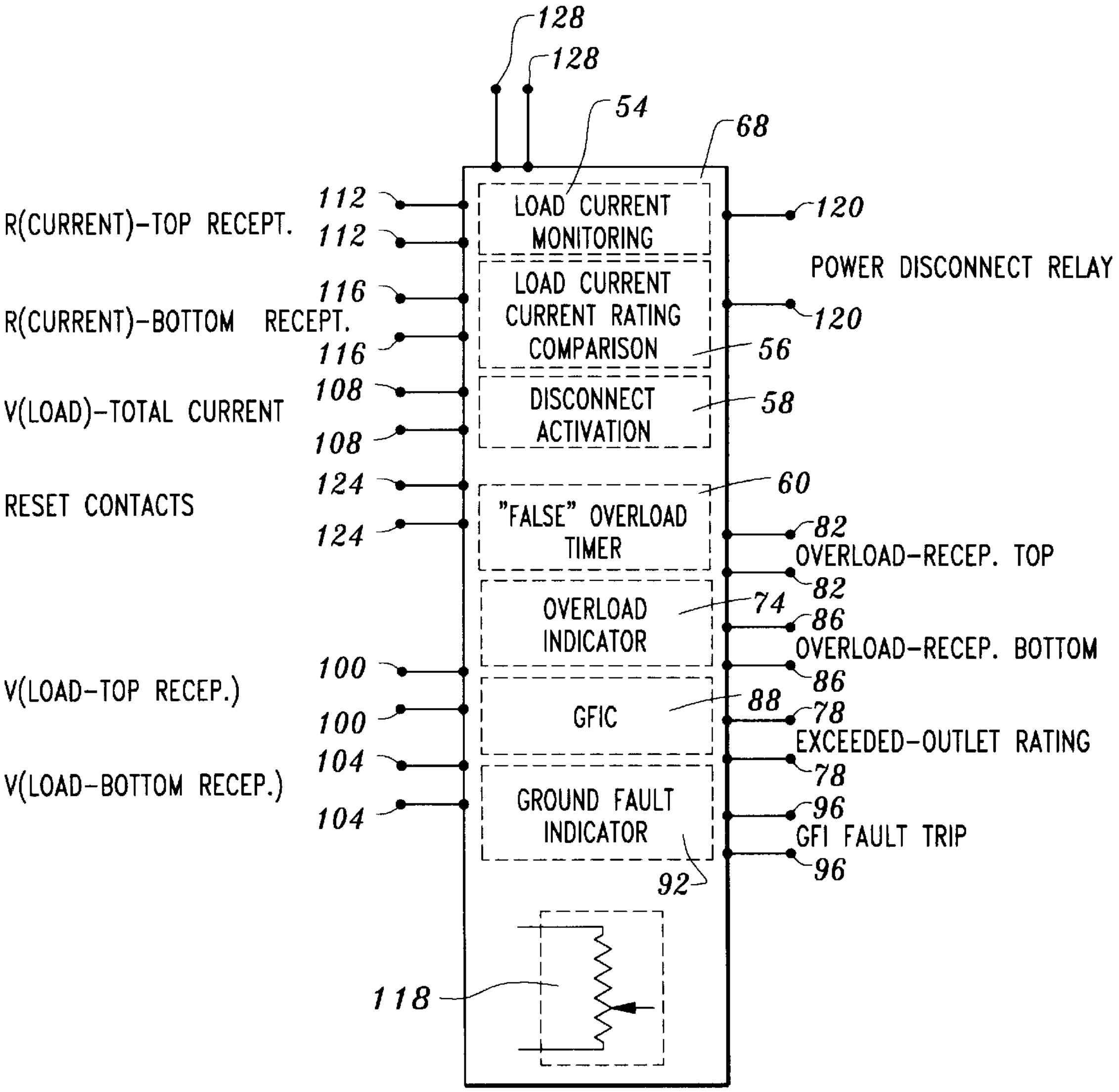
FIG. 7 is a functional block diagram of a power disconnect circuit for the dual receptacle electrical outlet of FIG. 5 and FIG. 6.

Referring now to FIG. 5 through FIG. 7, the electrical connection safety apparatus comprising the invention is shown embodied in a dual receptacle electrical outlet 62. Electrical outlet 62 includes a pair of electrical receptacles shown as top receptacle 16*a* and bottom receptacle 16*b*, which are generally identical to receptacle 16 described above and shown in FIG. 2, with like reference numbers denoting like parts. Thus, receptacles 16*a*, 16*b* of outlet 62 each include a pair of slots 18 for receiving connector prongs (not shown), and a movable arm 20 which pivots about hinge 22. Variable resistors 24*a*, 24*b*, associated with receptacles 16*a*, 16*b*, are positioned such that movable arms 20 will move variable resistors 24*a*, 24*b* according to connector prong length as described above. Movable arms 20 are shown in FIG. 6 in an "activated" position which results or occurs when connector prongs (not shown) are inserted into slots 18 and push on movable arms 20 so that the bias of spring 30 is overcome and conductor element 28 disengages reset contacts 26. Thus, receptacles 16*a*, 16*b* each include means for detecting connector current rating and reset means as described above. Receptacles 16*a*, 16*b* each include a slot 64 which is structured and configured to receive a connector ground prong (not shown) in a conventional manner. Electrical outlet 62 includes standard installation brackets 66 which allow outlet 62 to be attached to or supported on a stud or other support element within a wall by screws (not shown).

An electronic circuit board 68 (FIG. 7) is associated with outlet 62, and is preferably internally located within outlet 62. Circuit board 68 includes means for disconnecting power upon detection of a current overload which are provided by load current monitoring circuit 54, load current-current rating comparison circuit 56 and disconnect activation circuit 58. Means for preventing disconnection due to false overloads is provided by false overload timer circuit 60. Load current monitoring circuit 54, load current-current rating comparison circuit 56, disconnect activation circuit 58 and timer circuit 60 operate a generally similar manner to that described above for circuit board 40.

Since electrical outlet 62 includes two receptacles 16*a*, 16*b*, outlet 62 preferably includes means for indicating the location of an overload fault to apprise users of which receptacle 16*a*, 16*b* has experienced an overload fault. The overload fault indicating means preferably comprises an overload fault indicator light 69, a top receptacle indicator light 70, a bottom receptacle indicator light 72, and an overload indicator circuit 74 on circuit board 68. Indicator lights 69, 70, 72 are preferably light emitting diodes (LED) or low watt light bulbs. Overload indicator light 69 has contacts 76 which are operatively coupled to output contacts 78 on circuit board 68. Top receptacle indicator light 70 has contacts 80 which are operatively coupled to top receptacle overload output contacts 82 on circuit board 68, and bottom receptacle indicator light 72 has contacts 84 which are operatively coupled to bottom receptacle overload output contacts 86 on circuit board 68. When a current overload fault occurs in top receptacle 16*a*, overload fault indicator light 69 is activated together with top receptacle indicator light 70. When a current overload fault occurs in bottom receptacle 16*b*, overload fault indicator light 69 is activated together with bottom receptacle indicator light 72. When an overload fault occurs for outlet 62 generally as described below, overload fault indicator light 69 is activated together with both directional indicator lights 70, 72. In this manner, the location of an overload fault is indicated or identified for users of the invention.

Electrical outlet 62 includes means for disconnecting power to receptacles 16*a*, 16*b* and connectors associated therewith upon detection of a ground fault associated with either receptacle 16*a*, 16*b*. The ground fault power disconnecting means preferably comprises a conventional ground fault interruptor circuit or GFIC 88, together with power disconnect relay 42. The invention also preferably includes means for indicating the location of a ground fault, which are provided by ground fault indicator light 90 and ground fault indicator circuit 92. Ground fault indicator light 90 is preferably a LED or low watt light bulb, and has contacts 94 which are operatively coupled to GFI fault trip output contacts 96 on circuit board 68. When a ground fault occurs in top receptacle 16*a*, ground fault indicator light 90 is activated together with top receptacle indicator light 70. When a ground fault occurs in bottom receptacle 16*b*, ground fault indicator light 90 is activated together with bottom receptacle indicator light 72. In this manner, the location of a ground fault is indicated or identified for users of the invention.

Means for monitoring load current to electrical outlet 62 is preferably structured, configured and positioned to monitor load current to receptacles 16*a*, 16*b* individually as well as together. As shown in FIG. 6, three primary transformers 32*a*, 32*b*, 32*c*, together with accompanying secondary windings 34*a*, 34*b*, 34*c* are associated with line conductor 36. Line conductor 36 is split at junction point 98 so that line conductor 36 can provide power to both receptacles 16*a*, 16*b* via line conductors 36*a*, 36*b* respectively. Primary transformer 32*a* and secondary winding 34*a* are positioned on line conductor 36*a* below or "downstream" from junction point 98 so that secondary winding 34*a* produces a voltage signal V(load) representative of the load current delivered to receptacle 16*a*. Primary transformer 32*b* and secondary winding 34*b* are positioned on line conductor 36*b* below or "downstream" from junction point 98 so that secondary winding 34*b* produces a voltage signal V(load) representative of the load current delivered to receptacle 16*b*. Primary transformer 32*c* and secondary winding 34*c* are positioned on line conductor 36 above or "upstream" from junction point 98 so that secondary winding 34*c* produces a voltage signal V(load) representative of the total load current delivered to electrical outlet 62 via both receptacles 16*a*, 16*b*. Output contacts 99 from secondary winding 34*a* are operatively coupled to input contacts 100 on circuit board 68. Output contacts 102 from secondary winding 34*b* are operatively coupled to input contacts 104 on circuit board 68. Output contacts 106 from secondary winding 34*c* are operatively coupled to input contacts 108 on circuit board. The total load current to outlet 62 could alternatively be monitored according to the combined signal output of transformers 32*a*, 32*b* and secondary windings 34*a*,34*b*, with transformer 32*c* and secondary winding 34*c* being omitted.

The current rating detecting means of electrical outlet 62 is structured, configured and positioned to detect the individual current ratings for receptacles 16*a*, 16*b* and connectors associated therewith. Output contacts 110 associated with variable resistor 24*a* are operatively coupled to input contacts 112 on circuit board 68 to communicate resistance signals indicative of the current rating of connectors associated with receptacle 16*a*. Output contacts 114 associated with variable resistor 24*b* are operatively coupled to input contacts 116 on circuit board 68 to allow communication of resistance signals indicating the current rating of connectors associated with receptacle 16*b*.

Electrical outlet 62 includes means for providing a preset outlet current rating, and means for disconnecting electrical power to outlet 62 when the overall current load to outlet 62 exceeds the preset outlet current rating. A variable resistor 118 associated with circuit board 68 is preset, preferably by the manufacturer, to indicate a resistance value indicative of a maximum current rating for electrical outlet 62. Variable resistor 118 provides a resistance signal R(current) to comparison circuit 56 which indicates the preset current rating for outlet 62. Comparison circuit 56 compares the total load current to outlet 62 detected by transformer 32*c* to the preset outlet current rating provided by variable resistor 118, and when an overload situation occurs in which the total load current to outlet 62 exceeds the preset outlet current rating, power disconnect relay 42 is disconnected, as related below. The preset outlet current rating could alternatively be hardwired or integral to comparison circuit 56 rather than set or determined by variable resistor 118.

Power disconnect relay 42 is positioned so that line and neutral conductors 36, 38 are interrupted such that power is cut to the entire electrical outlet 62, including both receptacles 16*a*, 16*b*, in the event of detection of an overload fault or a ground fault. Output contacts 120 on circuit board 68 are operatively coupled to contacts 122 on power disconnect relay 42 to communicate an activation signal to power disconnect relay 42. Alternatively, dual power disconnect relays could be used with outlet 62, with one power disconnect relay positioned to interrupt line conductor 36*a* to receptacle 16*a*, and with one power disconnect relay positioned to interrupt line conductor 36*b* to receptacle 16*b*. However, use of a single power disconnect relay 42 positioned as shown is generally simpler and less expensive, and thus is preferred. Power disconnect relay 42 is activated as described below to disconnect power to outlet 62 upon detection of an overload fault in either top receptacle 16*a* or bottom receptacle 16*b*, as well upon detection of an overload fault with respect to the total detected current rating for outlet 62. Reset contacts 26 of both receptacles 16*a*, 16*b* are operatively coupled to circuit board 68 via output contacts 27 and reset input contacts 124 on circuit board 68, and power disconnect relay 42 is reset or reactivated according to a reset signal received by power disconnect activation circuit 58 from reset contacts 26. Power supply contacts 126 are operatively coupled to input contacts 128 on circuit board 68 to provide power to circuit board 68.

In the operation of electrical outlet 62, a user of the invention inserts a connector 10*a*, 10*b* or 10*c* (FIG. 1) into receptacle 16*a* and/or 16*b* as described above, so that connector prongs 12*a*, 12*b* or 12*c* engaged slots 18. The prongs pivot movable arm 20 by an amount which is proportional to prong length. Movable arm 20 moves variable resistor 24 to create a resistance signal output which is communicated to circuit board 68 as a voltage signal. The load current passing through receptacles 16*a* and 16*b* are respectively sensed by primary transformers 32*a*, 32*b* and secondary windings 34*a*, 34*b*, and corresponding voltage signals therefrom are communicated therefrom to circuit board 68. Additionally, the total load current passing through outlet 62 is sensed by primary transformer 32*c* and secondary winding 34*c* and communicated to circuit board 68 as a voltage signal.

Load current monitoring circuit 54 periodically monitors the voltage signals representing the sensed load currents to receptacles 16*a*, 16*b* and outlet 62. Comparison circuit 56 periodically compares the load currents through receptacles 16*a*, 16*b* to the detected current ratings for connectors which are plugged into receptacles 16*a*, 16*b*. Comparison circuit 56 also compares the total load current through outlet 62 and both receptacles 16*a*, 16*b* to the preset outlet current rating provided by variable resistor 118. Comparison circuit 56 recognizes or notes current overload situations (wherein measured load current exceeds detected current rating) which occur with respect to receptacles 16*a*, 16*b* individually, as well as for outlet 62 overall. When any such current overload event is recognized by comparison circuit 56, timing circuit 60 then measures the duration of the current overload period. If the duration of the current overload exceeds a certain threshold which indicates that the current overload is not a "false" overload such as a temporary current spike, disconnect activation circuit 58 then activates power disconnect relay 42 to interrupt or disconnect power to outlet 62.

Thus, power disconnection will occur in the event of a current overload associated with either receptacle 16*a*, 16*b* individually, or a current overload for electrical outlet 62 overall. If the current overload is associated with an individual receptacle 16*a* or 16*b*, overload indicator circuit 74 activates overload indicator light 69 together with top receptacle indicator light 70 or bottom receptacle indicator light 72. If an overall current overload has occurred to outlet 62, overload indicator circuit 74 activates overload indicator light 69 together with top receptacle indicator light 70 and bottom receptacle indicator light 72. GFIC circuit 88 detects ground faults in a conventional manner and activates power disconnect relay 42 in the event of a ground fault associated with receptacle 16*a* or 16*b*. Ground fault indicator circuit 92 then activates ground fault indicator light 90 together with top receptacle indicator light 70 or bottom receptacle indicator light 72, according to the location of the ground fault.

Following power disconnection of outlet 62 by power disconnect relay 42, the user of the invention notes the location of the overload fault according to top and bottom receptacle indicator lights 70, 72, corrects the cause of the overload faults and disengages connectors from receptacles 16*a* and/or 16*b* to reset outlet 62 and receptacles 16*a*, 16*b*. When connectors are disengaged from receptacles 16*a*, 16*b*, reset signals are sent to circuit board 68 from reset contacts 26. Upon receiving the reset signal, disconnect activation circuit 58 then closes or reset power disconnect relay 42 to again apply or provide power to outlet 62. Where an overload fault for outlet 62 has occurred (total load current has exceeded preset outlet current rating), resetting is carried out by unplugging or disengaging connectors from both receptacles 16*a*, 16*b*. The reset means of the invention also preferably applies to ground fault interruptions, such that disengaging connectors from receptacles 16*a*, 16*b* will reset GFIC 88 and disconnect activation circuit 58 to provide power to outlet 62. Once resetting occurs, the user can then re-engage connectors in receptacles 16*a*, 16*b*, and the above events are generally repeated.

The reset means of the invention may alternatively or additionally comprise a manually activated reset button or switch located on the front of outlet 62. The reset button or switch would preferably be located in generally the center of outlet 62 between indicator lights 70, 72, and between indicator lights 69, 90. Activation of the reset button would send a reset signal to disconnect activation circuit 58 to reset power disconnect relay 42 and restore power to receptacles 16*a*, 16*b*. As noted above, the power disconnect means of the invention may alternatively comprise a TRIAC or solid state switch.

Various other arrangements and configurations for electrical outlet 62 and receptacles 16*a*, 16*b* are possible and will suggest themselves to those of ordinary skill in the art. For example, the invention may be embodied in an electrical outlet having four receptacles, and current rating detection and load current monitoring in association with each of the four receptacles may be carried out. The invention also may be embodied in a single receptacle device having generally the combined features shown in FIG. 2, FIG. 3 and FIG. 4. These and other arrangements of electrical receptacles are considered to be within the scope of the invention. The operations carried out by circuit board 68 can also be embodied in software that runs on a conventional microprocessor which carries out the operations of monitoring load, comparing load current to detected connector current rating, measuring the duration of current overloads to detect "false" overloads, disconnecting power when load current exceeds the detected connector current rating of connector 10*a*, indicating the location of overload faults and ground faults, interrupting power upon detection of ground faults, and indicating the location of ground faults.

Figure 8:
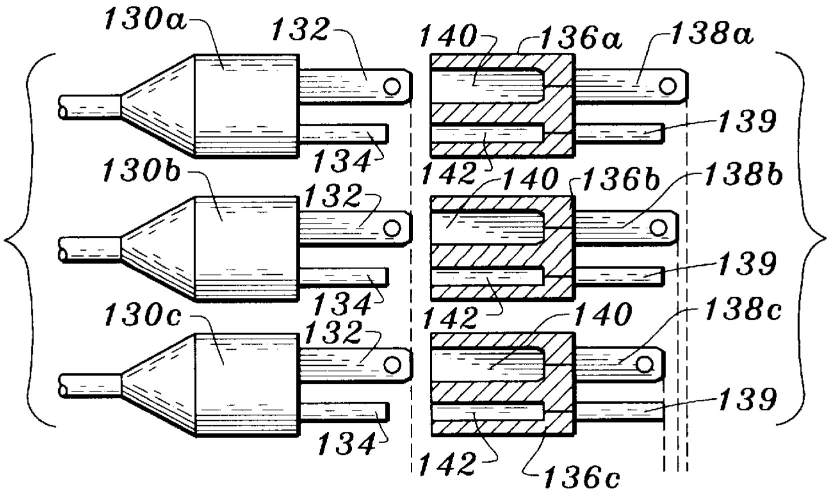
FIG. 8 is a side elevation view of electrical cord connector adaptors in accordance with the present invention for use with conventional electrical cord connectors.

The electrical connector safety apparatus of the invention as embodied in electrical outlet 62 and electrical connectors 10*a*, 10*b*, 10*c* can be employed with currently used electrical connectors and electrical outlets. As noted above, presently available electrical connectors have connector prongs which are not structured and configured to indicate the current rating of the connectors. Referring to FIG. 8, there are shown three conventional electrical connectors 130*a*, 130*b*, 130*c*, each of which has a different current rating. Conventional connectors 130*a*, 130*b*, 130*c* each have connector prongs 132 of identical length and ground prongs 134 of identical length, and thus include no current rating indicating means which can be used with the present invention.

FIG. 8 shows connector adaptors 136*a*, 136*b*, 136*c* which, in accordance with the present invention, include means for indicating current rating in the form of different connector prong lengths. Connector adaptors 136*a*, 136*b*, 136*c* respectively have long connector prongs 138*a*, intermediate length prongs 138*b* and short prongs 138*c*, to indicate different current ratings as described above. Connector adaptors

136*a*, 136*b*, 136*c* also include ground prongs 139 of generally the same length. Connector adaptors 136*a*, 136*b*, 136*c* each include connector prong slots 140 and ground prong slots 142 which are respectively structured and configured to slidably receive connector prongs 132 and ground prongs 134 of the conventional connectors 130*a*, 130*b*, 130*c*. Thus, by engaging the connector prongs 132 and ground prongs 134 of conventional connectors 130*a*, 130*b*, 130*c* into the slots 140, 142 of connector adaptors 136*a*, 136*b*, 136*c*, conventional connectors 130*a*, 130*b*, 130*c* can be adapted or modified to include current rating indicating means. The differing length connector prongs 138*a*, 138*b*, 138*c* of connector adaptors 130*a*, 130*b*, 130*c* engage the slots 18 of receptacles 16*a*, 16*b* of outlet 62 as described above.

Figure 9:
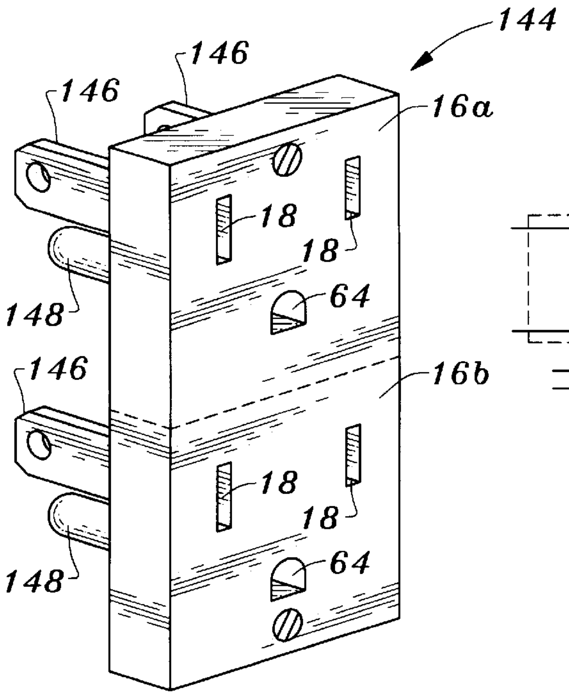
FIG. 9 is a perspective view of an electrical outlet adaptor in accordance with the present invention for use with conventional electrical outlets.

Referring also to FIG. 9, the invention may be embodied in an electrical outlet adaptor 144 which is structured and configured to engage or plug into a conventional dual receptacle outlet (not shown) of the type currently in use. Outlet adaptor 144 includes dual receptacles 16*a*, 16*b* which are generally identical to receptacles 16*a*, 16*b* as described above for outlet 62. Outlet adaptor 144 also includes a circuit board (not shown) having load current monitoring circuitry, current comparison circuitry, disconnect activation circuitry timing circuitry as described above. Connector prongs 146 and ground prongs 148 of outlet adaptor 144 provide means for engaging or plugging into a conventional electrical power outlet, and are structured and configured to engage or plug into a conventional power outlet and are operatively coupled respectively to connector slots 18 and ground slots 64 of receptacles 16*a*, 16*b*. Outlet adaptor 144 thus includes all of the features described above for electrical outlet 62 with the exception of the overload location indicating means and ground fault disconnection and indicating means. However, these features may be included with outlet adaptor 144 as well if desired.

By plugging connector prongs and ground prongs 146, 148 of outlet adaptor 144 into a conventional electrical outlet, the conventional outlet is modified to provide current rating detection, load current monitoring, and power disconnecting means for overload faults described above. In this manner, the invention can be employed without requiring removal and replacement of existing conventional electrical outlets. When outlet adaptor 144 is used in conjunction with connector adaptors 136*a*, 136*b*, 136*c*, the invention may be employed directly with existing, currently used electrical connectors and electrical outlets with requiring replacement of the existing connectors or outlets. Thus, a residence or other structure can be retrofitted to utilize the invention without requiring replacement of existing outlets, receptacles or connectors.

Figure 10:
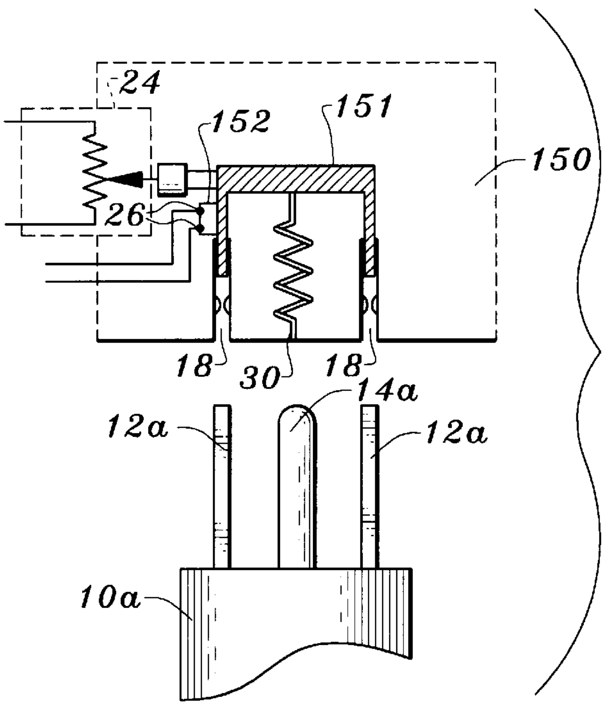
FIG. 10 is a functional diagram of an alternative embodiment electrical socket in accordance with the present invention which mechanically detects electrical cord current ratings according to the length of the cord connector prongs of FIG. 1.

Referring now to FIG. 10 an alternative embodiment electrical receptacle 150 is shown with a connector 10*a*, wherein like reference numerals denote like parts. In receptacle 150, the means for detecting length of connector prongs 12*a* is provided by a slidable bracket 151 which is positioned in association with slots 18. Slidable bracket 151 is operatively coupled to variable resistor 24 so that variable resistor 24 moves according to the motion of slidable bracket 151. Slidable bracket 151 is biased by spring 30 towards a reset position wherein reset contacts 26 are adjacent to a conductor 152 which is coupled to bracket 151 as shown. When connector prongs 12*a* are inserted into slots 18, slidable bracket 151 is physically moved by a distance proportional to the length of connector prongs 12*a*, with variable resistor generating a resistance output signal which reflects the length of connector prongs 12*a* as described above. Reset contacts 26 are disengaged from conductor 152 on slidable bracket 151 when connector prongs 12*a* are inserted into slots 18, and conductor 152 shorts reset contacts 26 to generate a reset signal when connector prongs 12*a* are withdrawn from slots 18. The electrical receptacle 150 operates in generally the same manner as described above for receptacles 16, 16*a*, and 16*b*, with the primary exception being that slidable bracket 151 is used to detect connector prong length instead of pivoting arm 20. The slidable bracket 151 generally requires a greater range of motion than movable arm 20, and thus results in receptacle 151 requiring more thickness or "depth" than receptacle 16 in order to accommodate sliding bracket 151. For this reason, receptacle 150 is less preferred than receptacle 16 for use with outlet adaptor 144, as use of receptacle 150 would require outlet adaptor 144 to have a greater size. Various other mechanical means for detecting connector prong length or other connector features indicative of current rating may also be used with the invention, and the use of pivoting and sliding members or brackets should not be considered as limiting.

Referring now to FIG. 11, the means for detecting the length of a connector prong may be optical, rather than mechanical. An electrical socket optical detector system 153 for the cord connector prongs is shown in FIG. 11 which includes a plurality of photoemitter/photodetector devices 154*a*, 154*b*, 154*c* are positioned adjacent slot 18. Photoemitter/ photodetectors 154*a*, 154*b*, 154*c* include an LED which emits light and a detector which senses reflected light. When connector prong 12*a* engages slot 18, connector prong is positioned adjacent one or more of photoemitter/ photodetectors 154*a*, 154*b*, 154*c*, depending upon the length of connector prong 12*a*. When connector prong 12*a* is positioned adjacent to photoemitter/photodetector 154*a*, 154*b*, or 154*c*, the amount of LED light reflected to the photodetector is changed by the presence of connector prong 12*a*, and a signal responsive to the presence of the connector prong 12*a* is generated by photoemitter/photodetectors. Varying lengths of connector prong 12*a* will correspondingly effect the number of photoemitter/photodetectors 154*a*, 154*b*, 154*c* which observe increased reflectivity. Thus, longer connector prongs 12*a* will result in higher detected reflectivity, and corresponding signal output, for each of photoemitter/photodetectors 154*a*, 154*b*, 154*c*, while shorter connector prongs 12*a* will only result in higher detected reflectivity for photoemitter/photodetectors 154*a*, and/or 154*b*, depending upon prong length. In this manner, the current rating of a connector may be determined optically according to connector prong length. Various other optical means for detecting connector current rating are possible, including the optical reading of bar codes or other indicia associated with connector prongs.

The invention may include a second, backup means for disconnecting power to a connector when the load current to a connector exceeds the connector current rating and an overload fault occurs. Referring to FIG. 12, there is shown an electrical connector 156 having a side opening or chamber 158 with a removable cover 160. A replaceable "slow-blow" fuse 162 fits within the chamber 158 and is operatively coupled to connector prong 164 and the internal conductor (not shown) associated with connector prong 164. Fuse 162 is structured and configured to "blow" or undergo filament disruption when the load current through connector 156 exceeds the current rating of connector 156 and an overload fault occurs. Connector prong 164 additionally has a length which indicates the current rating of connector 156 in the manner described above. Connector 156 is shown with a ground prong 166 as is standard in the art.

When connector 156 is utilized with receptacle 16*a* or 16*b* of electrical outlet 62 described above, the current rating detection, load current monitoring and power disconnect means associated with electrical outlet 62 provide a first power disconnecting means for preventing current overloads to connector 156, while fuse 162 provides a second or backup power disconnecting means for preventing overloads to connector 156. When an overload fault occurs and power is thus disconnected, fuse 164 is removed from chamber 158 and replaced, and connector 156 is unplugged from receptacle 16*a* or 16*b* of outlet to "reset" as described above.

Connector 156 may alternatively be used independently of outlet 62, with replaceable fuse 162 providing the sole or primary means for disconnecting power to a connector in the event of a current overload. Connector 156 may additionally be structured and configured as a connector adaptor similar to connector adaptors 136*a*, 136*b*, 136*b*, with fuse 162 removably positioned in the connector adaptor.

The operation of the electrical connection safety apparatus of the invention will be more fully understood by reference to the flow chart shown in FIG. 13. The method outlined in FIG. 13 is described generally in terms of use with electrical outlet 62.

At step 200, the current rating of a connector is indicated or otherwise shown. Referring also to FIG. 1, the indicating of a connector current rating is preferably carried out by providing connector prongs 12*a*, 12*b*, 12*c* of differing lengths, with each connector prong length indicating or corresponding to a different current rating for connectors 10*a*, 10*b*, 10*c*. As noted above, longer prongs preferably indicating higher current ratings. Thus, the longest connector prong 12*a*, for example, indicates a current rating for connector 10*a* of fifteen amps, while intermediate length connector prong 12*b* indicates a current rating of ten amps for connector 10*b*, and the shortest connector prong 12*c* indicates a current rating of five amps for connector 10*c*. Current rating indicating step 200 can alternatively be carried out by other means such as providing other detectable features on connector prongs 12*a*, 12*b* 12*c* which are indicative of the current rating of connectors 10*a*, 10*b*, 10*c*. Current rating indicating step can additionally be carried out by providing connector adaptors 136*a*, 136*b*, 136*c* which include differing prong lengths as means for indicating current rating.

At step 210, connector current rating is detected. Referring also to FIG. 5 through FIG. 7, the detection of connector current rating is preferably carried out via electrical receptacles 16*a*, 16*b* through the detection or sensing of the length of connector prongs which are inserted into slots 18 of receptacles 16*a*, 16*b*. Generally, a connector 10*a* is plugged into receptacle 16*a*and/or 16*b* in a standard manner, so that connector prong 12*a* engage a slot 18 and pushes on and pivots movable arm 20 by an amount which is proportional to the length of connector prong 12*a*, as described above. Movable arm 20 moves variable resistor 24 which creates a resistance signal output R(current) responsive to the length of prong 12*a* and the current rating of connector 10*a* which is communicated to circuit board 68 of outlet 62.

Step 210 also generally comprises the detecting of the preset current rating for electrical outlet 62 as determined by the adjustment of variable resistor 118 on circuit board 68. In this regard, the detecting of connector current rating step 210 also refers to and includes the detecting of the preset current rating of the electrical outlet into which connectors are plugged.

At step 220, the load current delivered to a connector is monitored. This step is generally carried out by monitoring the load current delivered to the electrical receptacle in which the connector is plugged or engaged. As noted above and shown in FIG. 6, the load current monitoring step can be carried out with respect to receptacles 16*a*, 16*b* individually as well as together for outlet 62. Primary transformers 32*a*, 32*b* and secondary windings 34*a*, 32*b* measure or detect load current to receptacles 16*a*, 16*b* respectively, while transformer 32*c* and secondary winding 34*c* measure load current to both receptacles 16*a*, 16*b* simultaneously and outlet 62 generally. Voltage signals representative of the load current detected by primary transformers 32*a*, 32*b*, 32*c* and secondary windings 34*a*, 34*b*, 34*c* are communicated to circuit board 68 wherein load current monitoring circuit 54 periodically checks or monitors the load current delivered to receptacles 16*a*, 16*b* and outlet 62 overall.

At step 230, detected or measured load current is compared to the detected connector current rating. This comparing step is generally carried out by comparison circuit 56 as described above. As also noted above, comparison of load current to connector current rating is carried out for receptacles 16*a*, 16*b* individually, as well as for electrical outlet 62. Thus, in step 230, comparison circuit 56 compares the load current delivered to receptacle 16*a* to the current rating of the connector plugged into receptacle 16*a*, compares the load current delivered to receptacle 16*b* to the current rating of the connector plugged into receptacle 16*b*, and also compares the overall load current delivered to outlet 62 (receptacles 16*a* and 16*b* together) to the preset current rating provided by variable resistor 118.

At step 240, comparison circuit 56 makes a query as to whether a current overload is detected in the form of a measured load current from step 220 which exceeds the connector current rating (or preset outlet current rating) detected in step 210. If no such current overload is detected, step 220 and step 230 are repeated. If a current overload is detected at step 240, step 250 is carried out.

At step 250, the duration of the current overload detected in step 240 is measured. False overload timing circuit 60 generally carries out this step via an internal timer such as an oscillating quartz crystal as described above, to insure that the current overload detected in step 240 is not a temporary current spike due to powering up an appliance or other cause.

At step 260 timing circuit 60 makes a query as to whether the duration of the current overload detected in step 240 has exceeded a preset or predetermined time period. Generally, situations in which the duration of a detected current overload do not exceed a predetermined length of time are considered "false" by timing circuit 60. If the duration of the detected current overload is less than the predetermined time period, steps 220 through 250 are repeated. If the duration of the detected current overload exceeds the predetermined time period, steps 270 is carried out.

At step 270, electrical power to the connector and associated receptacle are disconnected. This step is generally carried out by disconnect activation circuit 58 and power disconnect relay 42 as described above. Preferably, a single power disconnect relay 42 is used to disconnect power to electrical outlet 62 and both receptacles 16*a*, 16*b* as shown in FIG. 6, rather than individually interrupting power to receptacles 16*a*, 16*b* separately via multiple power disconnect relays.

At step 280 the location of the overload fault detected in step 240 is indicated. This step is generally carried out by overload indicator circuit 74 together with overload indicator light 69 and directional indicator lights 70, 72. If the current overload detected in step 240 is associated with an individual receptacle 16*a* or 16*b*, overload indicator circuit 74 activates overload indicator light 69 together with top receptacle indicator light 70 or bottom receptacle indicator light 72 accordingly. If an overall current overload has occurred to outlet 62, overload indicator circuit 74 activates overload indicator light 69 together with top receptacle indicator light 70 and bottom receptacle indicator light 72. The user of the invention at this point can locate and correct the current overload fault, thereby avoiding potential fire hazards associated with overload faults.

At step 290, electrical outlet 62 is "reset" by unplugging or disengaging connectors from receptacles 16*a* and/or 16*b*. If the overload fault detected in step 240 was associated with outlet 16*a* or 16*b* individually, the reset step 290 is carried out generally by unplugging the connector associated with 16*a* or 16*b*. If the overload fault detected in step 240 was an overall overload fault for outlet 62, then resetting is carried out by unplugging connectors from both receptacles 16*a*, 16*b*. As described above, when connectors are disengaged from receptacles 16*a*, 16*b*, movable arm 20 returns to the reset position and shorts reset contacts 26 which in turn send a reset signal to circuit board 68. Upon receiving the reset signal, disconnect activation circuit 58 re-connects or closes power disconnect relay so that power is again supplied to outlet 62 and receptacles 16*a*, 16*b*. Following reset step 290, steps 200 through 280 are repeated.

The method described above may additionally contain the steps of detecting a ground fault, interrupting power upon detection of a ground fault, and indicating the location of a ground fault. As noted above, these steps are carried out via a conventional ground fault interrupter circuit 88 together with ground fault indicator circuit 92, ground fault indicator light 90, and directional indicator lights 70, 72.

Accordingly, it will be seen that this invention provides an electrical connection safety apparatus which eliminates the risk of fire or electric shock associated with current overload faults in electrical systems, which senses or detects the electrical current rating of electrical connectors which are plugged into electrical outlets and disconnects power to the outlets and connectors whenever the connector current rating is exceeded, and which can be used with conventional electrical connectors and electrical outlets which are presently in use. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An electrical connection safety apparatus, comprising:

(a) means for detecting a current rating of an electrical connector according to a detectable feature designating said current rating of said electrical connector;

(b) means for detecting a load current delivered to said electrical connector; and (c) means for disconnecting power to said electrical connector when said load current exceeds said current rating of said electrical connector.

2. An electrical connection safety apparatus as recited in claim 1, further comprising means, associated with said detectable feature of said electrical connector, for indicating said current rating of said electrical connector.

3. An electrical connection safety apparatus as recited in claim 1, further comprising means for resetting said power disconnecting means.

4. An electrical connection safety apparatus as recited in claim 1, wherein said power disconnecting means further comprises means for preventing power disconnection due to false current overloads.

5. An electrical connection safety apparatus as recited in claim 1, further comprising means for indicating a location of a current overload fault.

6. An electrical connection safety apparatus as recited in claim 2, wherein said current rating indicating means comprises a connector prong, associated with said electrical connector, said connector prong having a length which is proportional to said current rating of said electrical connector.

7. An electrical connection safety apparatus as recited in claim 6, wherein said current rating detecting means comprises:

(a) means for detecting said length of said connector prong; and (b) means for generating an electrical signal responsive to said length of said connector prong.

8. An electrical connection safety apparatus as recited in claim 1, wherein said power disconnecting means comprises:

(a) means for monitoring said load current detecting means;

(b) means for comparing said detected load current to said connector current rating; and (c) means for activating a power disconnect relay when said detected load current exceeds said electrical connector current rating.

9. An electrical connection safety apparatus as recited in claim 1, wherein said electrical connector comprises a replaceable fuse.

10. An electrical connection safety apparatus as recited in claim 1, further comprising means for disconnecting power to said electrical connector when a ground fault is detected.

11. An electrical connection safety apparatus as recited in claim 10, further comprising means for indicating a location of a ground fault.

12. An electrical connection safety apparatus as recited in claim 2, wherein said current rating indicating means comprises a connector adaptor, said connector adaptor including a connector prong, said connector prong having a length which is proportional to said current rating of said electrical connector.

13. An electrical connection safety apparatus, comprising:

(a) means for indicating a current rating of an electrical connector, said indicating means associated with a detectable feature designating said current rating;

(b) means, associated with an electrical receptacle, for detecting said current rating of said electrical connector, according to said detectable feature of said electrical connector, when said electrical connector is plugged into said electrical receptacle;

(c) means for detecting a load current delivered to said electrical receptacle;

(d) means for disconnecting power to said electrical receptacle when said load current exceeds said current rating of said electrical connector; and (e) means for resetting said power disconnecting means.

14. An electrical connection safety apparatus as recited in claim 13, further comprising means for indicating a location of a current overload fault.

15. An electrical connection safety apparatus as recited in claim 13, wherein said current rating indicating means comprises a connector prong on said electrical connector, said connector prong having a length proportional to said current rating of said electrical connector.

16. An electrical connection safety apparatus as recited in claim 15, wherein said current rating detecting means comprises:

(a) means for detecting said length of said connector prong; and (b) means for generating an electrical signal responsive to said length of said connector prong.

17. An electrical connection safety apparatus as recited in claim 13, wherein said power disconnecting means comprises:

(a) means for monitoring said load current detecting means;

(b) means for comparing said detected load current to said connector current rating; and (c) means for activating a power disconnect relay when said detected load current exceeds said electrical connector current rating.

18. An electrical connection safety apparatus as recited in claim 16, wherein said means for detecting said length of said connector prong comprises a movable member, said movable member positioned in said electrical receptacle to interact with said connector prong when said connector prong is inserted into said electrical receptacle, said electrical signal generating means responsive to movement of said movable member.

19. An electrical connection safety apparatus as recited in claim 18, wherein said means for resetting said power disconnecting means comprises:

(a) reset contacts, said reset contacts associated with said movable member; and (b) bias means for returning said movable member to a reset position when said connector prong is removed from said electrical receptacle.

20. An electrical connection safety apparatus as recited in claim 13, wherein said electrical connector comprises a replaceable fuse.

21. An electrical connection safety apparatus as recited in claim 14, further comprising means for disconnecting power to said electrical connector when a ground fault is detected.

22. An electrical connection safety apparatus as recited in claim 21, further comprising means for indicating a location of a ground fault.

23. An electrical connection safety apparatus as recited in claim 13, wherein said current rating indicating means comprises a connector adaptor, said connector adaptor including a connector prong, said connector prong having a length which is proportional to said current rating of said electrical connector.

24. An electrical outlet safety apparatus, comprising:

(a) a plurality of electrical receptacles;

(b) means, associated with each said electrical receptacle, for detecting a current rating of an electrical connector according to a detectable feature thereof which designates said current rating, when said electrical connector is engaged in said electrical receptacle;

(c) means for detecting a load current delivered to each said electrical receptacle;

(d) means for disconnecting power to each said electrical receptacle when said load current to said receptacle exceeds said current rating of said electrical connector; and (e) means for resetting said means for disconnecting power to each said electrical receptacle.

25. An electrical outlet safety apparatus as recited in claim 24, further comprising:

(a) means for detecting a load current delivered to said electrical outlet;

(d) means for disconnecting power to said electrical outlet when said load current to said electrical outlet exceeds a preset electrical outlet current rating; and (e) means for resetting said means for disconnecting power to said electrical outlet.

26. An electrical outlet safety apparatus as recited in claim 24, wherein said means for disconnecting power to each said electrical receptacle comprises:

(a) electronic means for monitoring said load current detecting means;

(b) electronic means for comparing said detected load current to said connector current rating; and (c) electronic means for activating a power disconnect relay when said detected load current exceeds said electrical connector current rating.

27. An electrical outlet safety apparatus as recited in claim 26, wherein said current rating detecting means comprises:

(a) a movable member, said movable member positioned in said electrical receptacle to interact with a connector prong when said connector prong is inserted into said electrical receptacle, said connector prong having a length which indicates said current rating of said electrical connector; and (b) means for generating an electrical signal responsive to said length of said connector prong, said electrical signal generating means responsive to movement of said movable member.

28. An electrical outlet safety apparatus as recited in claim 27, wherein said means for resetting said power disconnecting means comprises:

(a) reset contacts, said reset contacts associated with said movable member; and (b) bias means for returning said movable member to a reset position when said connector prong is removed from said electrical receptacle.

29. An electrical outlet safety apparatus as recited in claim 24, further comprising means for indicating a location of a current overload fault.

30. An electrical outlet safety apparatus as recited in claim 24, further comprising:

(a) means for disconnecting power to said electrical connector when a ground fault is detected; and (b) means for indicating a location of a ground fault.

31. A method for preventing current overload in an electrical system, comprising the steps of:

(a) detecting a current rating for an electrical connector according to detectable feature designating said current rating;

(b) monitoring a load current delivered through said electrical connector;

(c) comparing said load current to said current rating; and (d) disconnecting electrical power to said electrical connector when said load current exceeds said current rating.

32. A method for preventing current overload in an electrical system as recited in claim 31, further comprising the step of indicating a current rating, according to said detectable feature, for said electrical connector.

33. A method for preventing current overload in an electrical system as recited in claim 31, further comprising the step of identifying a location of an overload fault.

34. A method for preventing current overload in an electrical system as recited in claim 31, further comprising the step of preventing said power disconnecting step in the event of a false overload.

35. A method for preventing current overload in an electrical system as recited in claim 31, further comprising the step of resetting power to said electrical connector.

* * * * *